Figure 1:
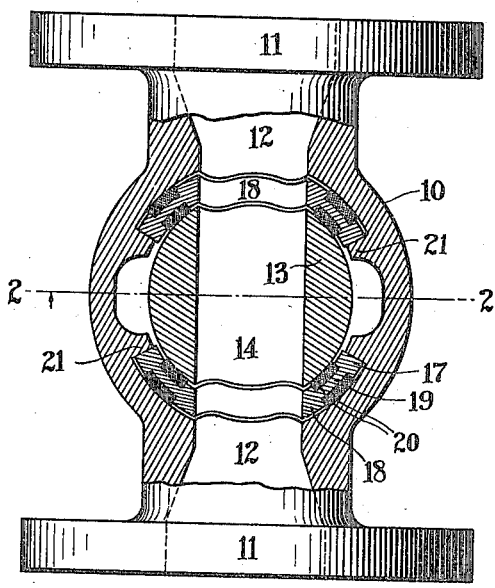

J. L. OSBORNE.
VALVE.
APPLICATION FILED OCT. 13, 1913.

1,157,956.

Patented Oct. 26, 1915.

Witnesses:
Clarence W. Carroll
D. Gurnee.

Inventor:
John L. Osborne
by his attorneys
Davis & Dorsey.

UNITED STATES PATENT OFFICE.

JOHN L. OSBORNE, OF ROCHESTER, NEW YORK, ASSIGNOR TO JUDSON GOVERNOR COMPANY, OF ROCHESTER, NEW YORK, A CORPORATION OF NEW YORK.

VALVE.

1,157,956.

Specification of Letters Patent.

Patented Oct. 26, 1915.

Application filed October 13, 1913. Serial No. 794,946.

*To all whom it may concern:*

Be it known that I, JOHN L. OSBORNE, a citizen of the United States, and resident of Rochester, in the county of Monroe and State of New York, have invented certain new and useful Improvements in Valves, of which the following is a specification.

This invention relates to valves, for controlling the flow of steam or other fluids, in which resilient or yielding packing-material, such as compounds containing asbestos-fiber, is employed between two relatively movable or slidable valve-members in order to effect a seal without the necessity of close contact between the metallic surfaces of the valve-members.

The invention is applicable to valves of various forms adapted for various uses, but is particularly useful in connection with valves of the type commonly known as "plug-cocks," especially where such valves are employed to control the flow of fluid containing sediment, or varying widely in temperature.

It has been previously proposed to employ resilient packing-material, in plug-cocks and other valves, by a construction in which one or more of the valve-members is formed with grooves into which the packing-material is driven or calked, alongside one or more of the fluid-passageways in the valve-members. In such a construction, however, if the grooves or recesses in which the packing is held are of such form as to retain it securely, it is impracticable to remove and replace the packing, when worn, without removing the valve as a whole from the pipe-line in which it is used. To avoid this disadvantage it has also been proposed to employ an intermediate sleeve between the rotary plug and the body of a plug-cock, this sleeve being provided with grooves in which the packing-material is calked. This latter construction is comparatively expensive, however, particularly as it necessitates machining operations for accurately fitting the sleeve to the other valve-members.

The object of the present invention is to produce a valve in which resilient or yielding packing-material is associated with a supporting-member of metal, or other comparatively rigid material, in such a manner that the packing-device as a whole may be conveniently removed from, and replaced in, operative position between the valve-members, and may produce an effective seal between these members when in operative position, while at the same time the packing-device is so formed and constructed as to be easily manufactured and inexpensive.

To the foregoing ends I employ a removable packing-device which is seated in a suitable recess between the valve-members, or in one or the other of them, and in which a body of plastic packing-material is molded between or around separated parts of a metallic or rigid support in such a manner as to produce a body of packing-material having continuous opposite surfaces adapted to engage, respectively, the two valve-members, while the plastic packing-material is effectually supported by the rigid support, particularly at its lateral edges. In a plug-cock the packing-device is preferably formed as a segmental annular member adapted to surround one of the fluid-passages or ports of the valve, and the packing-device, as a whole, may be readily removed from the valve-casing, or replaced therein, as will be hereinafter more fully set forth.

Figure 2:
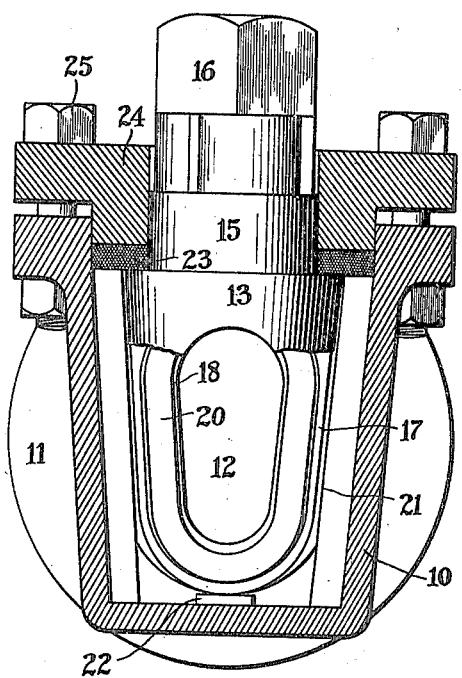
Figure 3:
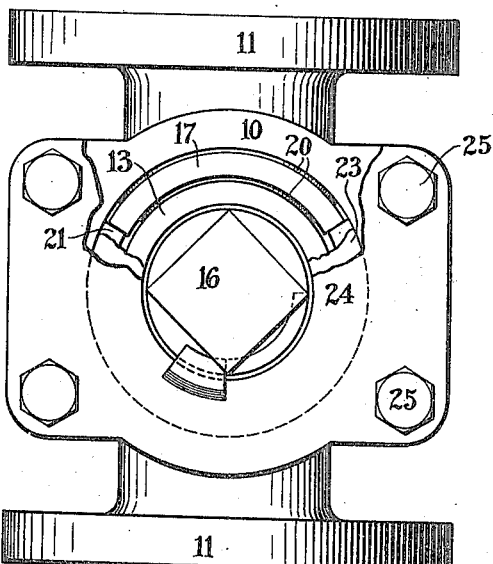
Figure 4:
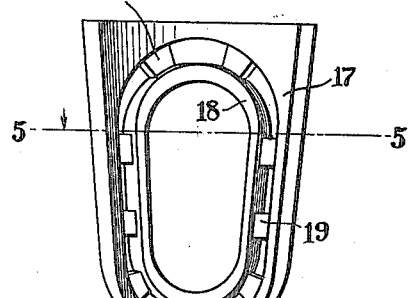
Figure 5:
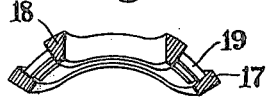

In the drawings:—Figure 1 is a plan-view of a plug-cock embodying the present invention, with the parts shown in horizontal section; Fig. 2 is a vertical section on the line 2—2 in Fig. 1; Fig. 3 is a plan-view of the plug-cock, with a part of the gland broken away; Fig. 4 is a front-elevation of the metal support of one of the packing-devices; and Fig. 5 is a horizontal section on the line 5—5 in Fig. 4.

The invention is illustrated as embodied in a straightway plug-cock of a well-known general form, having the usual hollow body 10, provided with flanges 11 for connecting it with a pipe-line, and with opposite fluid-passages 12. The rotary plug 13 is of ordinary form, being provided with a fluid-passageway 14 to register with the passageways 12 when the valve is in open position, and being somewhat tapered to permit the maintenance of a tight fit between the parts of the valve. The plug has the usual stem 15 with a squared upper end 16 to receive a wrench or handle.

In Fig. 1 two of the packing-devices peculiar to the present invention are shown in use, each of these devices being adapted to effect a seal between the plug and the valve-body around one of the passageways 12. As shown particularly in Figs. 4 and 5, each packing-device comprises a support which may be cast in one piece of iron or other metal. This support has two separated annular members 17 and 18, the inner member 18 defining the fluid-passageway through the packing-device. The members 17 and 18 are connected by a series of separated connecting-members 19, which bridge the space between them, but are narrower than this space.

The yielding packing-material may be of various compositions, but for this purpose I preferably employ a composition containing asbestos-fiber, together with a suitable plastic cementing-material such as rubber-compound. In forming the packing-device this material, when in plastic form, is pressed into the space between the members 17 and 18 of the support, and around the connecting-members 19, these latter members being thus entirely embedded in the packing-material. The material is then molded and vulcanized in place, so as to form a homogeneous body which completely fills the space between the members 17 and 18 and extends slightly beyond the surfaces of these members, as shown in Fig. 1. Since the connecting-members 19 are completely embedded in and covered by the packing-material, this material presents two oppositely-disposed continuous surfaces 20, bounded by the members 17 and 18 and adapted to engage, respectively, the valve-body and the plug.

The packing-device just described is curved to a segmental form, so as to conform to the curvature of the plug 13 and the valve-body 10. The valve-body is of sufficient diameter to provide a space between itself and the plug for the reception of the packing-devices, and to retain these devices in operative position the body is provided with vertical inwardly-projecting flanges 21, which engage the outer edges of the members 17 of the supports. To support the packing-devices against vertical movement the valve-body is also provided with upwardly-projecting lugs 22, as shown in Fig. 2, which engage the lower ends of the packing-devices.

The upper ends of the packing-devices are made flat and are arranged flush with the upper ends of the flanges 21 and with the shoulder at the upper end of the conical portion of the plug 13. A ring 23 of yielding packing-material is placed upon all of these surfaces, and is pressed home by a gland 24 drawn into the upper end of the valve-body by means of bolts 25. The packing-ring 23 not only affords a seal against the escape of any fluid which may leak between the packing-device and the valve-members, but it also affords resilient means for forcing the plug downwardly between the packing-devices, and this force, acting through the conical plug, causes the packing-devices to be forced in opposite directions with sufficient pressure to produce an effective seal between the yielding packing-material and the inner surface of the valve-body.

Owing to the fact that the yielding packing-material alone is depended upon to effect a seal between the valve-body and the plug, it is not necessary that there be any contact between the metal support of the sealing-device and either the plug or the valve-body. Accordingly, this support need not be machined or finished in any way, and can be very inexpensively cast at one operation in its final form. For the same reason it is unnecessary to machine the inner surface of the valve-body, since the packing-material will yield to the slight inequalities in the surface produced by casting this body. Accordingly, the conical surface of the plug is the only part that requires machining, and this need not be ground to an accurate fit, but need only be smooth enough to avoid injury to the packing-material.

When the packing has become so worn as to require renewal, it is necessary merely to remove the gland 24 and the packing-ring 23 whereupon the plug may be withdrawn from the valve-body, and the packing-devices may then be also withdrawn without the necessity of any instruments for this purpose, and fresh packing-devices may be dropped into place. Upon the replacement of the parts and the tightening of the gland, the plug will seat itself against the new packing-devices and also force them out to their seats in the valve-body, and these operations may obviously be performed without disturbing the valve-body from its operative position.

I claim:—

In a plug-cock having a body and a rotatable plug with an annular space between their opposed surfaces, a packing having the general form of a segment of said space and comprising an annular strip of comparatively yielding plastic material having opposite faces curved to conform to the opposed surfaces of a valve-body and plug; inner and outer annular reinforcing members, of comparatively rigid material, engaging and supporting the lateral surfaces of the yielding material, but of slightly less thickness, so that the yielding material extends beyond the reinforcing-members at each of its opposite faces; and a series of narrow, separated connecting-members, of less thickness than the reinforcing-members, embedded in the yielding material between its faces and connecting the reinforcing members.

JOHN L. OSBORNE.

Witnesses:
 FARNUM F. DORSEY,
 D. GURNEE.

Copies of this patent may be obtained for five cents each, by addressing the "Commissioner of Patents, Washington, D. C."